July 13, 1965 C. D. SHAW 3,194,868
PROCESS AND APPARATUS FOR MOLDING THERMOSETTING MATERIAL
Filed Sept. 20, 1963 5 Sheets-Sheet 1

INVENTOR.
CLEMENT D. SHAW
BY
ATTORNEYS

July 13, 1965    C. D. SHAW    3,194,868
PROCESS AND APPARATUS FOR MOLDING THERMOSETTING MATERIAL
Filed Sept. 20, 1963    5 Sheets-Sheet 2
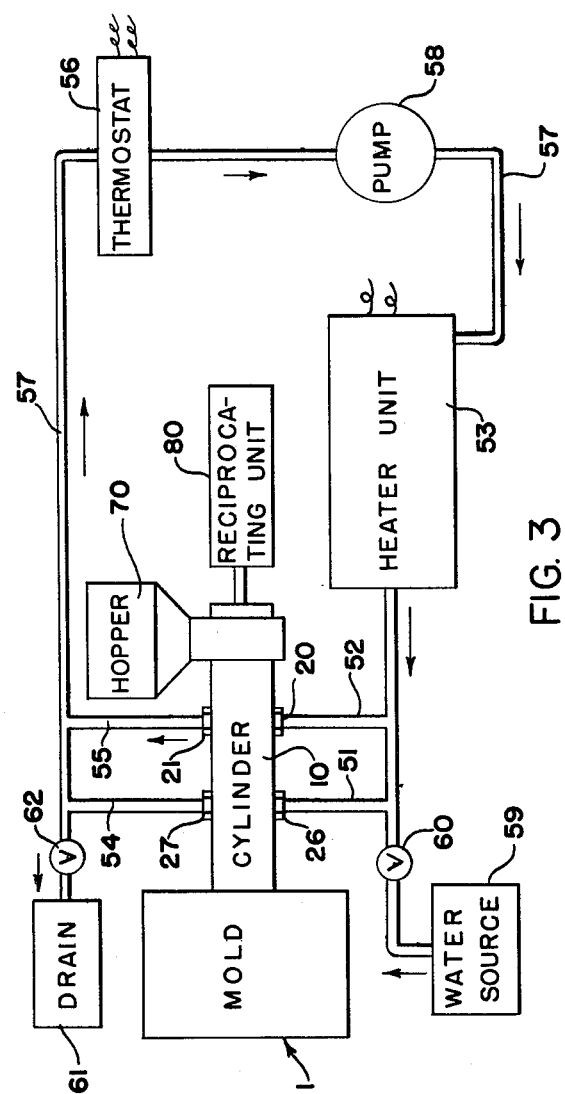
INVENTOR.
CLEMENT D. SHAW
BY
ATTORNEYS

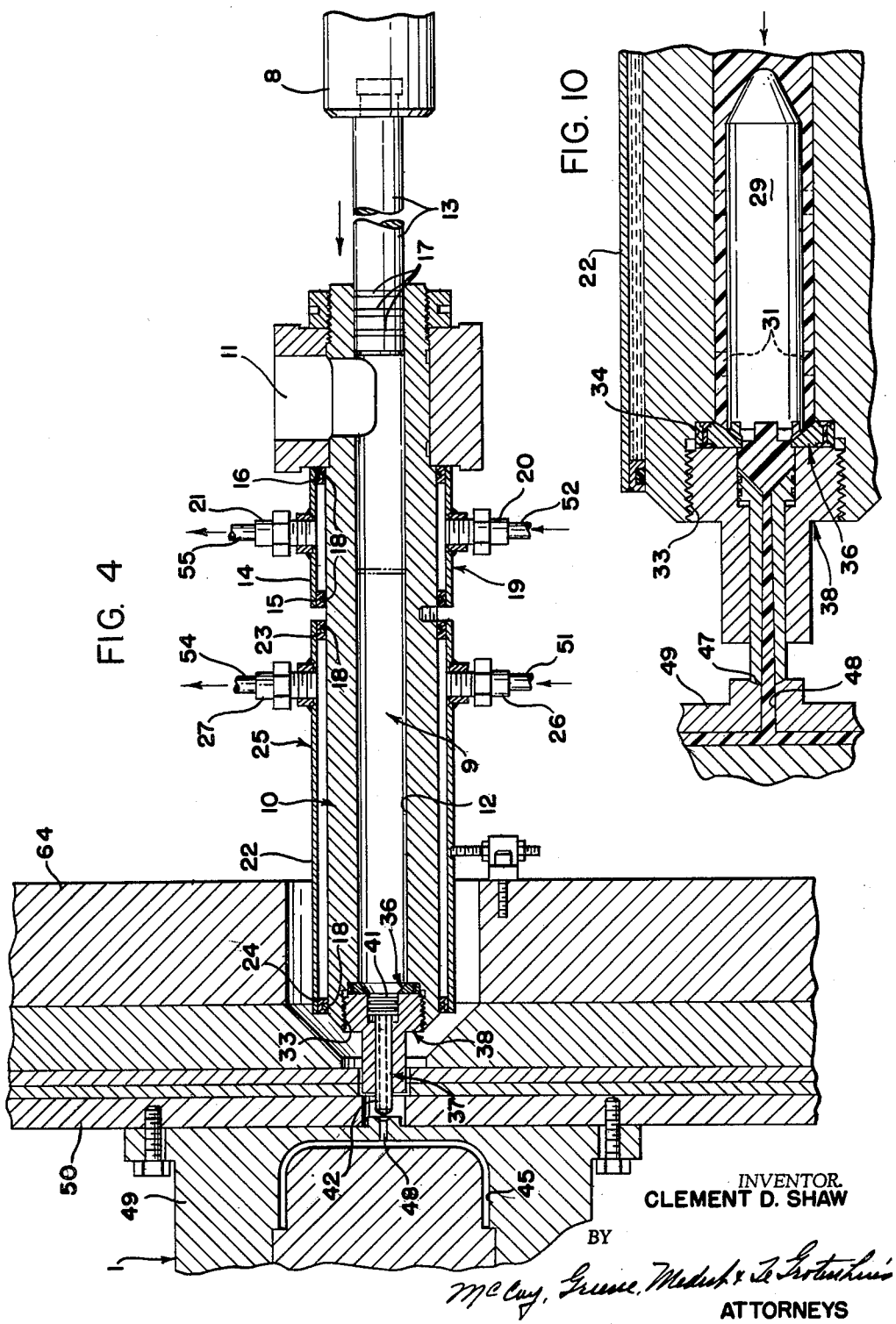

July 13, 1965  C. D. SHAW  3,194,868
PROCESS AND APPARATUS FOR MOLDING THERMOSETTING MATERIAL
Filed Sept. 20, 1963 5 Sheets-Sheet 4

INVENTOR.
CLEMENT D. SHAW

ATTORNEYS

United States Patent Office 3,194,868
Patented July 13, 1965

3,194,868
PROCESS AND APPARATUS FOR MOLDING
THERMOSETTING MATERIAL
Clement D. Shaw, 1502 Tarpon Center Drive, Venice, Fla.
Filed Sept. 20, 1963, Ser. No. 310,398
14 Claims. (Cl. 264—328)

This application is a continuation-in-part of my copending application Serial No. 769,922, filed October 27, 1958, now abandoned.

The present invention relates to the art of molding thermosetting material and more particularly to a process for injection molding both elastic and rigid thermosetting materials which employs an axially movable nozzle and sealing means of novel construction.

In the past, injection molding machines have been used almost exclusively with thermoplastic materials using known injection molding techniques, but such techniques are not suitable for rubber or other thermosetting materials which vulcanize or set up when heated to predetermined temperatures. Various injection molding machines have been used to mold thermosetting materials, such as rubber, but a satisfactory solution to the molding problem was not found.

Because injection molding of such materials was unsatisfactory, it has been the practice to place the raw or uncured thermosetting compound into the mold cavity in the cold state and thereafter set up or cure the material under heat and pressure even though such practice was costly and time consuming.

More than a decade prior to this invention, machines were developed for the purpose of injection molding of rubber, but these machines were not considered acceptable by the industry. One such machine is described in an article in Rubber Age, December 1944 (pages 277–286). As pointed out in this article, the injection molding process is used almost exclusively with thermoplastic materials which must be cooled to effect hardening and do not set up in the heated passages of the equipment. The article further points out that thermosetting materials, such as rubber, must be heated to soften and thermally plasticize the material so that it will flow and properly fill the mold cavity and that, since only a few degrees of temperature separate the desired range of thermoplasticity from the range of vulcanization, the injection molding of thermosetting materials, such as rubber, is infinitely more difficult to perform and to control than the molding of thermoplastic materials.

While machines of the type described in the article were made and used they did not prove to be practicable and therefore were unacceptable for various reasons. For example, such machines did not eliminate premature curing or vulcanization of the rubber in the charging chamber and were clearly unsuitable for making intricate parts.

The apparatus shown in United States Patents No. 2,296,295 and 2,296,296, was used in the trade in spite of certain disadvantages, but such apparatus was not a complete solution to the problem and does not compare with the apparatus of this invention which employs an axially movable nozzle member and other novel structures.

The process of the present invention includes the steps of introducing the rubber or other thermosetting material in a raw or cold state into the charging chamber of an injection molding machine, moving the composition in progressive steps through the charging chamber toward the discharge end thereof while simultaneously transferring heat to the composition to obtain the desired plasticity, and then moving the plasticized composition through an axially movable self-sealing tubular conduit or nozzle at said discharge end into a mold that is heated to a temperature above the vulcanization or setting temperature of the composition. Rapidly recirculating heated water is employed to effect the desired heating and to maintain the desired temperatures in the thermosetting composition as it is passing through the charging chamber. The axially movable conduit or nozzle is advanced and held against the inlet of the heated mold by high pressure during injection to prevent leakage and is retracted out of contact with the mold when the pressure is released after the material in the runner system has set up or vulcanized. This retraction breaks the intimate contact of the discharge end of the nozzle with the heated mold and, in so doing, prevents the transfer of excessive heat into the nozzle which heat would tend to pre-vulcanize or precure the material within the nozzle. By blocking this heat transfer the material at the inner end of the nozzle is left in an uncured state which is suitable for injection into the mold on the next successive injection cycle. The small amount of cured or vulcanized material at the discharge end of the nozzle becomes an integral part of the sprue and runner system which is withdrawn from the machine when the molded parts are removed at the conclusion of each cycle. High speed production is, therefore, possible with thermosetting material as was previously accomplished with thermoplastic material in previously known machines.

An object of the present invention is to provide a process for injection molding of thermosetting materials which does not have the drawbacks and undesirable features of prior processes in this field as pointed out above, which reduces the time cycle for molding articles from thermosetting materials, which reduces the cost of manufacture, and which minimizes waste of material.

Another object of the invention is to provide an injection molding apparatus for rubber or other thermosetting material which minimizes the danger of unwanted vulcanization or curing of the material in the nozzle or charging chamber.

A further object of the invention is to provide, in an injection molding apparatus, a recirculating water system which preheats the thermosetting material to obtain the desired plasticity and maintains the material at the proper temperature as it passes through the charging chamber and into the mold, so as to avoid premature curing of the material in the charging chamber and nozzle.

Other objects, uses and advantages of this invention will become apparent from the following description and claims taken in conjunction with the accompanying drawings, in which:

FIGURE 2 is a top plan view of the machine shown in FIGURE 1 on the same scale;

FIGURE 3 is a diagrammatic view showing the apparatus of the invention and the water circulating apparatus associated therewith;

FIGURE 4 is a fragmentary vertical sectional view on a reduced scale through a part of the injection molding device including the injection cylinder, nozzle and heating chamber assembly and through a portion of an associated mold;

FIGURE 10 is a fragmentary vertical sectional view similar to FIGURE 5 but showing a modified form which employs a spreader or "torpedo."

Figure 1:
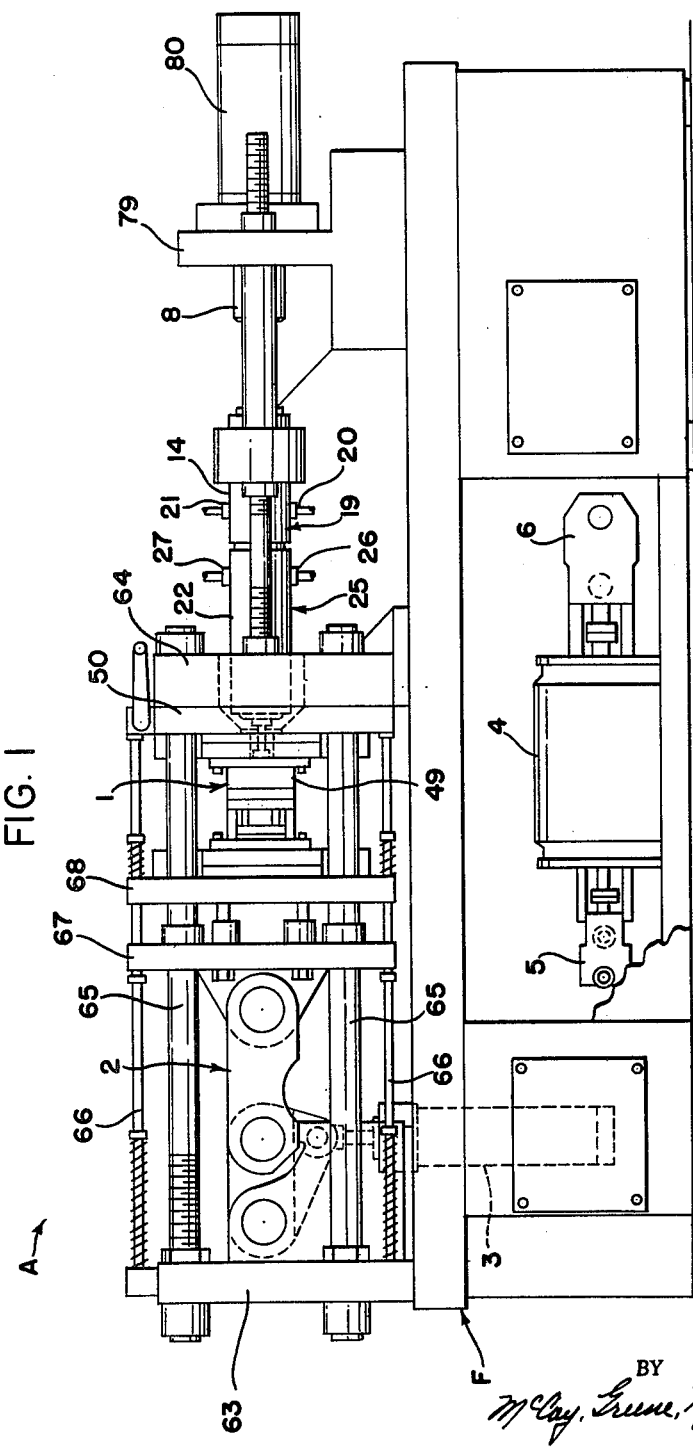
FIGURE 1 is a side elevational view on a reduced scale showing an injection molding machine which incorporates the apparatus of the present invention.
Figure 5:
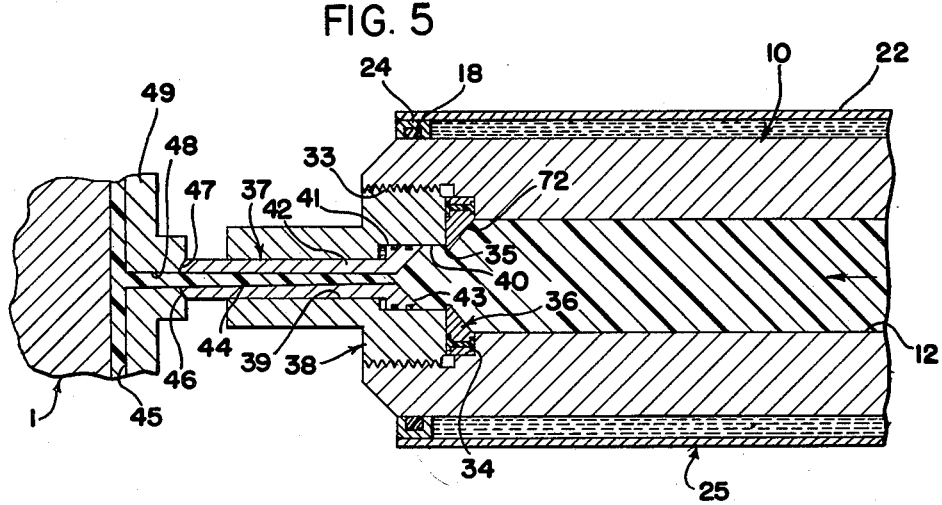
FIGURE 5 is a fragmentary vertical sectional view of the nozzle end of the injection cylinder shown in FIGURE 1, the parts being shown in their positions when the charging piston is in its forward position forcing the thermosetting material into the mold cavity.
Figure 6:
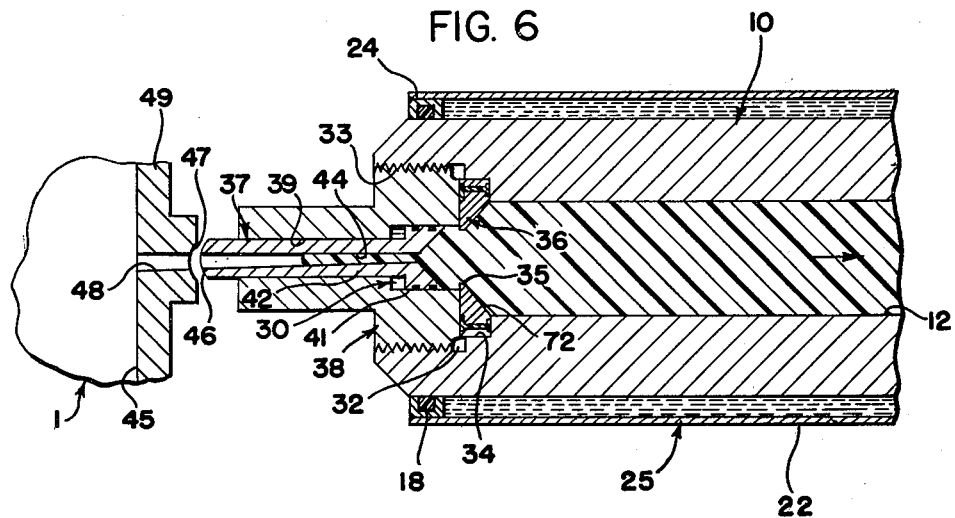
FIGURE 6 is a fragmentary sectional view similar to FIGURE 5 and on the same scale showing the parts in their positions when the charging piston has been retracted and that portion of the material which has been cured has been removed from the nozzle.

Referring to the drawings, there is illustrated in FIGURES 1 and 2 an injection molding machine used with the process of this invention, which is shown in more detail in FIGURES 3 to 9. The details of such injection molding apparatus form no part of the invention, and a detailed description is, therefore, unnecessary. The art of injection molding is an old one as illustrated, for example in my United States Patents No. 2,296,295 and 2,296,296.

FIGURES 1 and 2 show an injection molding machine A having a rigid frame F on which is mounted a die assembly 1 that is opened and closed by a toggle mechanism 2, the necessary force being provided by the hydraulic cylinder 3. An electrical motor 4 drives the pumps 5 and 6 to provide sources of hydraulic fluid under pressure. The frame has vertical plates 63 and 64 rigidly mounted thereon to provide supports for horizontal strain rods 65 and horizontal pull rods 66. A vertical plate 67, a platen assembly 68 and a die plate assembly 50 are supported on the strain rods. At the opposite end of the machine a rigid injection frame 79 is provided. A hydraulic cylinder 80 is mounted on the frame 79 and has a piston 13 for feeding thermosetting material as will be described in more detail hereinafter.

FIGURES 3 to 9 of the drawings illustrate an apparatus which may be used in carrying out the process of the present invention. This apparatus includes a charging cylinder, broadly indicated by the numeral 10, which is supported in any suitable manner in the housing of the injection molding machine A. The charging cylinder has an inlet opening 11 which is located adjacent the end of a hopper 70 (see FIGURE 3), or any other suitable means, not shown, for feeding a thermosetting material in a raw state into the charging chamber 9 (FIGURE 4) of the cylinder. The inner surface 12 of the charging chamber 9 is shaped to conform to the charging piston 13, which is arranged to reciprocate therein, and said surface is preferably a cylinder of substantially the same diameter as said piston. The piston may be actuated by a hydraulic cylinder 80 or other reciprocating unit having an actuator 8 rigidly connected to the piston. A plurality of axially spaced annular grooves 17 are provided on the piston 13 to prevent leakage around said piston.

Surrounding the outer wall of the cylinder 10, immediately forward of the opening 11, is a cylindrical metal sleeve 14 having spaced metal rings or channels 15 and 16 secured to the inner surface thereof at the opposite ends of the sleeve. The annular rings 15 and 16 are provided with channels or grooves 17 which receive packing rings 18 of a suitable packing material. The sleeve 14 and the outer surface of cylinder 10 define a water jacket 19 into which heated water may be introduced through the inlet fitting 20 and discharged through the outlet fitting 21. The water circulating through the jacket 19 maintains the cylinder 10 at the proper temperature and prevents overheating of the thermosetting material in the chamber 9.

A second cylindrical metal sleeve 22 similar to the sleeve 14 extends from the outer end of the cylinder 10 substantially to the sleeve 14 as shown in FIGURE 4 and has spaced rings or channels 23 and 24 secured to its inner surface at its opposite ends. Said rings are provided with annular grooves for receiving circular sealing rings 18 similar to those of the rings 15 and 16, which rings may be made of elastic rubber or other suitable packing material. The sleeve 22 and the outer surface of cylinder 10 define an annular water jacket 25 surrounding the forward end of the cylinder 10. Heated water or other fluid is introduced into the jacket 25 through the inlet fitting 26 and is discharged through the outlet fitting 27. In the normal operation of the cylinder the temperature of the water introduced into the water jackets 19 and 25 is from 150° to 250° F. and is preferably at least 200° F.

As the rubber or other thermosetting material is moved through the zones within the cylinder chamber 9, which are located or defined by the water jackets 19 and 25, it is gradually heated to the predetermined temperature (i.e., 150° to 250° F.) at which the thermosetting material has the desired degree of plasticity. The rapidly circulating water passing through the jackets 19 and 25 heats the thermosetting material to the required temperature for molding and maintains the material at such temperature. Any setting up or curing of the material in the chamber 9 and in the opening through the nozzle due to heat feedback or heat of work is avoided, the circulating water serving as a coolant to absorb such heat.

In the event the thermosetting material sets up or vulcanizes within the cylinder 10, it is relatively easy to effect complete purging of the chamber due to the construction of the apparatus. It will be noted that the cylinder 10 has a bore 12 of uniform diameter which diameter is the same as that of the injection plunger or piston 13 and that the nozzle assembly, described in more detail hereinafter, is readily removable so that the hardened or vulcanized material can readily be forced out of the heating cylinder by the forward movement of the injection piston 13.

A "torpedo" or spreader 29 may be rigidly mounted at the forward end of the cylinder chamber 9 by means of spiders 30' and 31' as shown in FIGURE 10 and as shown in my copending application Serial No. 769,922, but this is unnecessary and may be omitted as will be apparent to those skilled in the art. It will be understood that the modified apparatus of FIGURE 10 is exactly the same as the apparatus of FIGURES 3 to 9 except for said spreader.

The front end of the cylinder 10 is provided with a threaded bore 33 terminating in a cylindrical counterbore 34. An externally cylindrical sealing ring 36 having a circular opening 35 therethrough is seated in the counterbore 34 between the nozzle assembly and the cylinder chamber. The bore 33 is internally threaded to receive the externally threaded plug member 38, the flat inner end surface of which engages the flat end of the ring 36 and secures the same in its proper seated position within the counterbore. The plug member 38 has a cylindrical bore 39 therethrough and a cylindrical counterbore 40 of larger diameter at its inner end communicating with the chamber 9.

Figure 7:
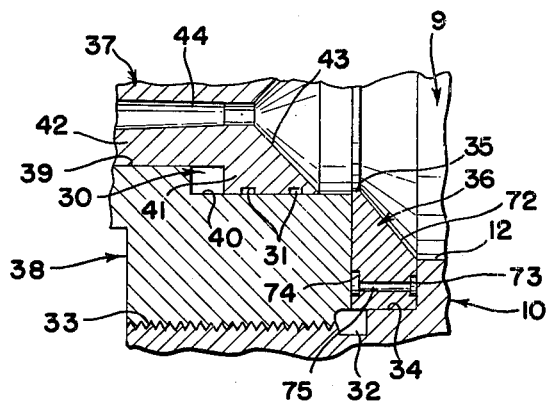
FIGURE 7 is a fragmentary vertical sectional view taken at the same section as FIGURES 5 and 6 but on a larger scale, the thermosetting material being omitted.

Slidably mounted within the member 38 is an elongated nozzle member 37 having an enlarged cylindrical head portion 41 of a size to fit in the counterbore 40 as shown in FIGURE 7. The nozzle member has a cylindrical projecting portion or shank 42 of substantially the same diameter as the bore 39 which projects axially beyond the end surface of the plug member 38. The head portion 41 of the nozzle is provided with a conical recess 43 that communicates with a narrow tapered passage 44 which gradually increases in diameter from the recess 43 to the discharge end thereof.

At its outer end the nozzle member 37 has a spherical nose surface 46 which is arranged to seat within a spherical recess 47 formed about the gate 48 of the mold 49 which is mounted on the platen 50 of the molding machine A. The spherical surfaces insure uniform application of pressure without the necessity for accurate alignment. The mold and platen are provided with suitable heating means to heat the mold and the mold cavity 45 to the required temperature for injection molding of the thermosetting material, said temperature depending on the type of thermosetting material being used. The material used in the process of this invention may be a natural or synthetic rubber-like material that is vulcanized or cured or may be other thermosetting or heat-setting materials such as the phenobis, melamine condensates, diallyl phthalate, etc.

Whenever the nozzle 42 makes contact with the mold at the recess 47 there is a considerable transfer of heat by conduction, and there is some heat transfer by radiation, even when the nozzle is out of contact with the recess 47. The proper temperature is maintained in the nozzle by employing a water heating system wherein the heated water is recirculated very rapidly. This greatly decreases the time required for a response to changes in temperature of the cylinder 10 and also provides the recirculation system with a heat dissipating rate at least equal to the heat absorption rate of the nozzle, whereby the parts are maintained at the desired temperature. Thus, thermostat 56 is made more quickly aware of a drop in temperature of cylinder 10 via the rapidly recirculating water. When the temperature drops, said thermostat responds by actuating heater unit 53 to add an additional amount of heat energy to the water. If there is a rise in the temperature of the recirculating water due to a rise in temperature of the cylinder 10, the thermostat 56 is quickly aware of such rise and responds by quickly decreasing or shutting off the heat energy being supplied to the water by the heating unit 53, thereby preventing overheating and vulcanization or curing of the thermosetting material.

FIGURE 3 shows the water recirculating apparatus in schematic form. This apparatus includes conduits 51 and 52 which supply the heated water from the heater unit 53 to the inlets 26 and 20, respectively, of the cylinder 10. The water flows to said conduits through a supply conduit 57, a pump 58 being provided to circulate the water. Additional water may be introduced into the system by a water source 59 when the valve 60 is opened, and water may be removed from the system to drain 61 by opening the valve 62. The water leaving the cylinder 10 at the outlets 27 and 21, respectively, is carried by conduits 54 and 55 to the conduit 57 and passes the thermostat 56 as it is returned to the pump 58.

It will be apparent how the apparatus of FIGURE 3 operates. During the night, the valve 60 is left slightly open and valve 62 is open. As a result, a small amount of cool water from the municipal water system or other source continuously flows through jackets 14 and 25 maintaining the cylinder 10 and any thermosetting material in the chamber 9 at a reduced temperature so that such thermosetting material does not set up. Prior to the start of the injection cycle, the mold 49 is heated by electrical heaters or other suitable means, the cylinder and piston not being placed into operation until the mold is brought up to the desired temperature. Because of its close proximity to the mold 49 and other hot structures, however, the cylinder 10 is absorbing a considerable amount of heat which must be dissipated to prevent vulcanization or setting up of the material in the forward end of chamber 9 and the nozzle assembly 37. This dissipation may be accomplished by opening valve 60 to permit cool water to flow through jackets 14 and 25 while the mold 49 is being heated.

When mold 49 has been brought up to the proper temperature, the valve 62 is closed, the pump 58 is started and heated water is circulated through the jackets 14 and 25. The rapidly recirculating water quickly brings the temperature of the cylinder 10 up to the desired value so that injection molding can begin. The thermostat 56 controls the heater unit 53 to provide water heated to the desired constant temperature.

Initially, the heater unit 53 is operated frequently and a substantial amount of heat energy is supplied to the water to replace the energy absorbed by the thermosetting material and the heat lost in other parts of the equipment. After a lapse of time, however, the heat energy being supplied by the surrounding heated structures permits the heating unit 53 to be used less frequently.

If the equipment is shut down, even for a short period of time, it is desirable to open valve 62 and thereby permit rapid cooling of the cylinder 10 by the water from the source 59. Such cooling is desirable because of the large amount of heat radiated to nozzle 37 and cylinder 10 from the heated mold. The interruption of the flow of thermosetting material through the nozzle might cause the temperature of the cylinder to rise above the vulcanization or curing temperature of the material if such cooling were not provided. However, the rapidly circulating heated water does tend to maintain the desired temperature even when the valve 62 is closed.

The apparatus shown in the drawings is particularly well suited for use with natural and synthetic rubber compositions, which are regarded as thermosetting materials since they set up or cure to the elastic non-plastic state when heated. Such apparatus is also suitable for use with conventional thermosetting plastics.

Figure 8:
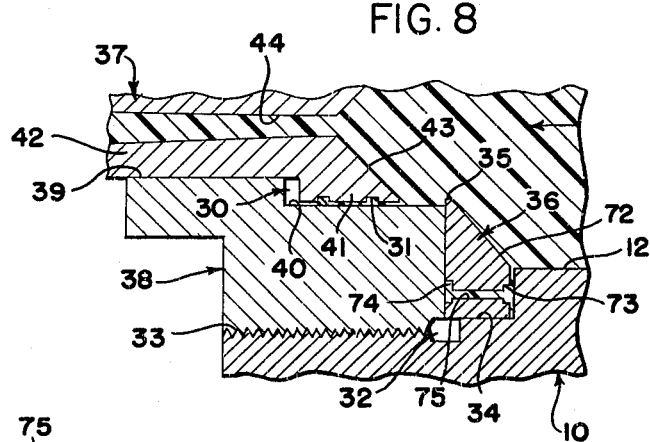
FIGURE 8 is a fragmentary vertical sectional view similar to FIGURE 7 and on the same scale showing the parts in the same positions as in FIGURE 5 when full pressure is applied.
Figure 9:
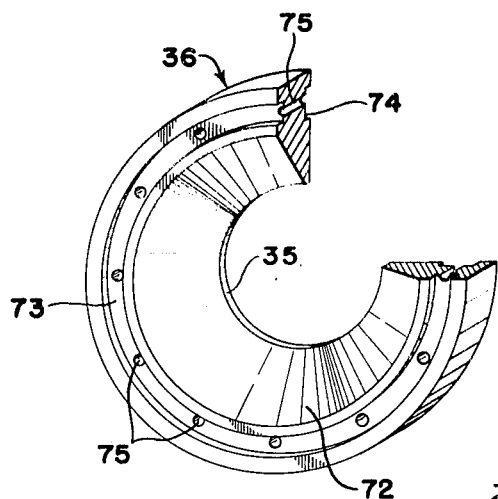
FIGURE 9 is a perspective view with parts broken away and shown in section showing the metal sealing ring which is employed near the end of the charging cylinder.

The enlarged portion 41 (FIGURES 5 and 6) of the axially movable nozzle member 37 is in the form of a cylinder with an external diameter substantially equal to the internal diameter of the counterbore 40 and has a plurality of axially spaced circumferential grooves 31 which fill automatically with the material being molded to form a seal to prevent loss of pressure and to prevent leakage of thermosetting material into the chamber 30 defined by the forward wall of head 41 and the counterbore 40. It is not necessary to provide special sealing rings for the grooves 31 since the uncured rubber or other thermosetting material leaking around the head will fill the grooves and set up or vulcanize to the non-plastic state to provide an excellent seal. This is best shown in FIGURE 8. It will be seen that any clearance space between the head 41 and the counterbore 40 will be filled by the rubber or other thermosetting material and that the heating of the material by heat transfer from the nozzle will harden this material to form a seal around the piston.

The thermosetting material which flows into the grooves 31 thus forms self-manufactured seals. Such a seal forms a bearing surface which tends to keep the head 41 centered in the cylinder and to equalize pressure around the circumference while preventing sticking or welding of said head to the cylinder wall, whereby the head is easily retracted with the nozzle by vacuum when the charging piston 13 is retracted. This seal also prevents leakage of material into the void 30 which after vulcanizing, would prevent advancing movement of the piston and interfere with operation of the machine. Because the various self-manufactured seals in the apparatus of this invention are very effective, it is possible to apply pressure of many thousand pounds per square inch to the material in the chamber 9 and in the mold cavity 45.

Since the high pressure tends to cause leakage between the surfaces 46 and 47 at the end of the nozzle, the pressure acting on said surfaces is multiplied by enlarging the head portion at 41 so that the cross-sectional area thereof receiving pressure is greater than that of the shank 42. There is also a strong tendency for the thermosetting material to leak around the ring 36 to the threaded bore 33 and to leak around the threads of the plug 38. If such leakage is substantial, the pressure acting on the full cross-sectional area of the plug 38 can cause stresses sufficient to crack or rupture the cylinder. Also the thermosetting material will harden at the threads tending to seize the parts and make it difficult to remove the nut 38 for the purging and cleaning which is necessary periodically.

As shown in FIGURES 5 to 10, inclusive, the ring 36 is provided with axially aligned annular grooves 73 and 74 in its opposite faces which are placed in communication by a series of passages 75, whereby both grooves are subjected to the same pressure. The ring 36 is clamped tightly between the flat bottom of the nut 38 and the flat bottom of the counterbore 34 as best shown in FIGURE 7 and is provided with a frusto-conical surface 72 to facilitate even flow into the counterbore 40. The circular hole 35 of the ring 36 preferably has a diameter slightly less than that of the counterbore 40 to limit rearward movement of the head 41.

The extremely high pressures applied to the material in the charging chamber causes it to flow toward the grooves 73 and 74 and puts a load on the threads of the nut 38 tending to separate the ring 36 from the flat bottom of the bore 34. Since the material can flow from the groove 73 to the groove 74, the pressures on opposite sides of the ring 36 are balanced, a more effective sealing action is obtained, and the stresses on the threads are reduced. The self-manufactured seals at 73 and 74 are very effective and prevent leakage of any thermosetting material to the threads at 33 or the annular space 32 at the end of such threads. The seals not only prevent damage to the cylinder 10 but also make it easier to disassemble and assemble the machine when purging or cleaning are required.

The process of the present invention permits mass production of articles from rubber or other thermosetting materials using an injection molding machine and repeating the same cycle of operation over and over again. The process eliminates the necessity for cleaning or purging of the nozzle after each cycle since the raw material remaining at the inlet portion of the nozzle at the end of the cycle is maintained at a temperature below its curing temperature so that it does not harden before the next cycle is initiated. An axially movable nozzle and rapidly circulating heated water are employed in the process of this invention to effect the improved results.

In this process, the raw vulcanizable rubber-like material or other thermosetting material is fed in increments through the stationary charging cylinder 10 toward the axially movable discharge nozzle 37 while it is progressively heated in the cylinder to a temperature just below its vulcanization temperature to facilitate plastic flow of said material and to produce a minimum total curing cycle. When high pressure is applied to the raw material, it is forced through the axially tapered passageway 44 into the heated mold which has a temperature sufficient to vulcanize or cure the material; and during this application of high pressure, the nozzle is subjected to an axial force which holds it against the inlet of the heated mold to prevent leakage of the material at said inlet, the high pressure being maintained on the material and on the nozzle until the material has vulcanized or set up in the passageway 44. When, in the course of the molding cycle, the mold has become filled, material will cease to flow thru the nozzle, and the charging plunger will retract. This retraction breaks the intimate contact between the nozzle and the heated mold thus blocking the transfer of heat into the nozzle from the mold. Material at the inner end of the nozzle is thus permitted to remain in a raw or uncured state suitable for injection into the mold on the next cycle rather than curing and effectively plugging the nozzle with hardened substance.

This prevents the raw unvulcanized material remaining at the entrance to said passageway from vulcanizing or setting up in the short period of time between successive cycles of operation so that such material may be injected into the mold cavity in the subsequent cycle without the necessity for purging of the nozzle. The temperature of such remaining material at the entrance to the nozzle is held below the vulcanization temperature and at an amount no less than the temperature of the other raw material near the discharge end of the charging cylinder until the high pressure is again applied to said material by the charging piston to initiate the next cycle.

Since chilling of such remaining material to a very low temperature is undesirable at the end of each cycle, the process of this invention avoids such chilling. The process employs water or other suitable liquid heated to a preselected elevated temperature below the vulcanization or setting temperature of the thermosetting material and rapidly circulates such fluid around the intermediate and end portions of the cylinder to effect the progressive heating of said material in said cylinder and also to prevent vulcanization or setting up of the material remaining at the inlet end of the passageway 44 at the end of the cycle, whereby such material may be injected into the mold cavity in the next successive cycle. The novel co-operation between the movable nozzle and the rapidly circulating heated water thus permits high speed automatic production by eliminating the need for purging of the nozzle between cycles.

Although this invention has been described and illustrated in detail, it will be understood that, in accordance with the patent laws, such description is by way of illustration and example only and that variations and modifications of the specific processes and apparatuses described herein may be made without departing from the spirit of the invention.

Having described my invention what I claim is:

1. In an injection molding process for mass production of articles from thermosetting material wherein the same cycle of operation is repeated over and over again without purging of the equipment and wherein the thermosetting material is advanced in increments through a charging cylinder toward a discharge nozzle and is progressively heated in said cylinder to a temperature below its curing temperature to facilitate plastic flow, each cycle comprising in seriatim the steps of (1) applying a high pressure to the material in said cylinder to force it through said nozzle into the internal cavity of a mold that is heated to a temperature sufficient to cure said material, (2) maintaining the pressure until the material in said mold passages and at the discharge end of said nozzle has cured to the non-plastic state, and (3) removing the non-plastic thermoset material from said mold cavity before the next successive cycle, the improvement which comprises the steps of maintaining said cylinder in a fixed position away from the heated mold to reduce the transfer of heat from said mold to said cylinder, providing the nozzle with a long tapered axial passageway which gradually increases in diameter from its inlet end to its outlet end, applying high pressure to the material and holding the nozzle in contact with the heated mold during each cycle for a period of time such that the point of transition of the thermosetting material from its plastic to its non-plastic state is near the inlet end of the nozzle when such contact is broken, moving said nozzle axially relative to said cylinder in accordance with the pressure applied to the thermosetting material to advance the nozzle axially against the inlet of the heated mold when a high pressure is applied to said material; to retract the nozzle out of contact with the heated mold when the pressure is reduced whereby the heat transfer from the heated mold is so minimized that the material remaining at the inner end of said passageway is maintained in the uncured state; severing the cured from the uncured portion of material in said passageway and injecting said remaining uncured material into the mold cavity in the next molding cycle.

2. In an injection molding process for mass production of articles from raw vulcanizable rubber-like material, the steps which comprise feeding said raw material in increments through a stationary charging cylinder toward an axially movable discharge nozzle while progressively heating the raw material in said cylinder to a temperature below its vulcanization temperature to facilitate plastic flow and reduce total molding cycle time, said nozzle having a long narrow tapered axial passageway which gradually increases in diameter from its inlet end to its outlet end, said feeding being effected by periodically applying high pressure to said raw material to force it through said passageway into a shaping mold spaced from said cylinder and heated to a temperature sufficient to vulcanize said material with simultaneously applying an axial pressure to said nozzle in a direction to hold it against the inlet of the heated mold and to prevent leakage of said material at the mold inlet, maintaining the pressure on said raw material until the material has vulcanized in the mold passageway, then reducing the pressure and simultaneously retracting said nozzle axially relative to said cylinder to reduce the transfer of heat from said mold to said nozzle and said cylinder, and to prevent the raw unvulcanized material remaining at the exist to said nozzle passageway from vulcanizing prior to the next subsequent application of pressure, holding the temperature of said remaining material below the vulcanization temperature and near the temperature of the adjacent raw material in said cylinder until the high pressure is again applied to said raw material, and repeating the cycle to force said remaining material at the inlet end of said nozzle passageway through said nozzle passageway into the heated mold.

3. A process as defined in claim 2 wherein a liquid heated to a preselected elevated temperature below the vulcanization temperature of said material is rapidly circulated around said cylinder to effect the progressive heating of said material in said cylinder and, acting as a coolant, to prevent vulcanization of said remaining material at the inlet end of said nozzle passageway.

4. In an automatic injection molding machine, a mold having an internal mold cavity for receiving thermosetting material and means for heating the mold to a temperature sufficient to cure said material, a mold inlet in the heated mold in communication with said mold cavity, and apparatus spaced from the heated mold for periodically feeding the thermosetting material into said mold cavity including an axially elongated charging cylinder having heating means including axially spaced water jackets and means for rapidly circulating liquid through said jackets for progressively heating the thermosetting material as it flows from the inlet end to the discharge end of said cylinder to a temperature below but approaching the curing temperature and for maintaining the temperature of the material in the charging chamber of said cylinder below said curing temperature, a charging piston mounted for reciprocation in said cylinder near the inlet end thereof, removable means for closing the discharge end of said cylinder comprising a hollow plug detachably connected to said cylinder and a sealing ring clamped between the end of said plug and said cylinder to prevent leakage at the outer periphery of said plug, said plug having an axial bore and counterbore substantially in alignment with said mold inlet, said counterbore being located at the end portion of said plug nearest said charging chamber, an axially elongated tubular conduit with a length materially greater than that of said plug having a shank portion of reduced diameter mounted for limited reciprocation in said bore from a retracted position out of contact with said mold to an advanced operating position against said mold inlet wherein the thermosetting material is directed to said mold cavity, means for preventing leakage of said material between said mold inlet and the end of said conduit when the conduit is held in said operating position, said tubular conduit having an enlarged self-sealing piston at its inlet end mounted for reciprocation in said counterbore to effect movement of said conduit between said operating position and said retracted position in response to movement of said charging piston, said self-sealing piston having peripheral sealing means comprising axially spaced grooves, means for retracting said charging piston and for simultaneously retracting said self-sealing piston to retract the conduit to stop the conduction of heat directly from the mold through said conduit to said cylinder, whereby the plastic thermosetting material remaining at the inlet end of said conduit may be fed into the mold cavity in the next cycle of operation without purging of the apparatus.

5. Injection molding apparatus as defined in claim 4 wherein said mold inlet has a concave marginal surface of generally spherical curvature and said shank portion has a convex nose surface of similar curvature for engaging said concave surface to prevent leakage when the thermosetting material is fed to the mold cavity under high pressure and wherein said shank portion has a long tapered axial passageway which gradually decreases in diameter in a direction away from said mold inlet.

6. Injection molding apparatus as defined in claim 4 wherein said self-sealing piston has a tapered concave recess of generally frusto-conical shape coaxial with and facing said charging chamber and said sealing ring comprises a rigid annulus coaxial with said cylinder and having a generally frusto-conical surface extending from the internal cylindrical surface of said cylinder substantially to said counterbore to facilitate flow of the thermosetting material to said concave recess, said tubular conduit having a long narrow tapered axial passageway which gradually increases in diameter from said concave recess to the discharge end of said conduit.

7. Injection molding apparatus as defined in claim 4 wherein said plug has a bottom surface perpendicular to the axis of said cylinder and extending radially outwardly from said counterbore and said sealing ring comprises a rigid annulus with opposite side faces generally parallel to the bottom surface of said plug and a generally frusto-conical surface extending from the internal cylindrical surface of said cylinder toward said counterbore, each of said opposite side faces having a groove therein, and passage means extending axially through said sealing ring to connect the grooves on opposite sides of said ring.

8. In an automatic injection molding machine for thermosetting material having a mold with an internal cavity for shaping such material and means heating said cavity to a temperature sufficient to cure such material, apparatus spaced from the heated mold for periodically feeding said material into said cavity, said apparatus comprising: a charging cylinder having a charging piston mounted for reciprocation therein near the inlet end of said cylinder for periodically advancing said material from said inlet end toward the discharge end of said cylinder, said cylinder having an internally threaded bore at said discharge end and a flat shoulder near the end of said bore adjacent the internal cylindrical surface of said cylinder, a removable annular plug having external threads which fit the threads of said cylinder, said plug being screwed into said cylinder and having a flat bottom surface perpendicular to the axis of said cylinder and parallel and spaced from the flat annular surface of said shoulder, a rigid annular sealing ring fitting between said plug and said shoulder having a tapered generally frusto-conical surface for directing the thermosetting material from said cylinder to the central opening of said plug, and an axially elongated nozzle member mounted for reciprocation in said central opening for directing said thermosetting material to the mold cavity, the opposite side faces of said sealing ring having circumferential grooves facing the flat surfaces of said shoulder and said plug, said sealing ring having axial passages connecting the circumferential grooves on opposite sides of said ring, whereby the high pressure applied to the thermosetting material by said charging piston is transmitted to both sides of said sealing ring.

9. In an automatic injection molding machine having a heated mold cavity communicating with a mold inlet, apparatus for periodically feeding thermosetting material in the plastic state through said inlet to said mold cavity, said apparatus comprising an axially elongated charging cylinder rigidly mounted in a fixed position and having a charging piston mounted for reciprocation therein near the inlet end of said cylinder and having an internally threaded opening in the discharge end of the cylinder, a removable hollow plug in said opening having an axial bore and counterbore and external threads which fit the threads of said cylinder, said counterbore being located adjacent the charging chamber formed by the cylinder between said plug and said piston, an axially elongated tubular conduit with a length greater than that of said plug mounted for reciprocation in said bore from a retracted position to an advanced position against said mold inlet and having an enlarged head at its inlet end of a size to fit said counterbore which reciprocates in said counterbore, said conduit projecting forwardly from said plug and having a tapered axial passageway therethrough for transmitting the thermosetting material from said charging chamber to said mold inlet, said passageway gradually increasing in diameter from the inlet to the discharge end thereof, self-sealing means for preventing leakage from said charging chamber at said plug when said piston is advanced to apply high pressure to the thermosetting material in said charging chamber, means for retracting said piston and simultaneously retracting said tubular conduit out of intimate contact with said mold inlet to minimize the heat transfer from the mold to said conduit, and means for progressively heating the thermosetting material as it is moved from the inlet to the discharge end of said cylinder so as to plasticize the material in the charging chamber thereof and for maintaining the temperature at the entrance to said conduit below the curing temperature of said material.

10. An apparatus for injection molding of thermosetting material comprising a mold having an internal cavity for receiving injections of plasticized thermosetting material through an inlet orifice, means for maintaining the temperature of said mold above the setting temperature of said material, an assembly for periodically feeding said thermosetting material to said mold including a stationary charging cylinder, a charging piston reciprocable in said cylinder to feed the material from the inlet end to the discharge end of said cylinder, a removable hollow plug member rigidly mounted in the discharge end of said cylinder and having an axial nozzle-receiving opening, and an axially elongated nozzle slidably mounted in the opening of said plug member and having a narrow tapered axial passageway leading from the interior of said cylinder to the outer end of said nozzle, said nozzle being mounted to slide in said plug in response to the reciprocating movement of said charging piston in a manner to make contact with the inlet orifice of said mold when said piston is advanced to apply pressure to the thermosetting material in said cylinder and to move out of contact with said inlet orifice when said piston is retracted, means for supplying thermosetting material to said cylinder, sealing means for effecting a seal between the end of said plug and the end of the cylinder and serving to retain said nozzle in the axial opening of said plug member, said sealing means comprising a sealing ring having a groove to receive thermosetting material, means for retracting said charging piston and simultaneously retracting said nozzle to reduce the heat transfer from said mold to said assembly, a water jacket surrounding said cylinder having inlet and outlet orifices, a recirculating water system including a recirculating pump, thermostatically controlled heating means responsive to changes in the temperature of the recirculating water to maintain said temperature at a preselected level, and heat dissipating means having a heat dissipating capacity sufficient to remove heat energy at a rate at least as great as the maximum rate of heat absorption by said assembly from all sources less the rate of heat energy absorption by said thermosetting material at the rate of flow of said material through said nozzzle, said last-named means progressively raising the temperature of the thermosetting material passing through said cylinder to the temperature of plastification but below said setting temperature.

11. Apparatus as defined in claim 10 wherein the flow of said thermosetting material is unobstructed from said charging piston to the opening of said plug.

12. A process as defined in claim 1 wherein said thermosetting composition is a vulcanizable rubber and is heated to a temperature of about 150° to 250° F. as it flows through said cylinder.

13. An apparatus for molding thermosetting material comprising a mold; means for maintaining the temperature of said mold above the temperature at which setting of said material occurs during the time and at the pressure said material is injected and maintained in said mold; a nozzle assembly including a cylinder, a piston member reciprocable in said cylinder, an elongated nozzle slidably mounted in said cylinder and having a discharge orifice leading from said cylinder, said elongated nozzle being positioned to slide in said cylinder in response to the reciprocating movement of said piston, an inlet orifice to said cylinder, a spreader mounted adjacent to the discharge end of said cylinder, a plug in the discharge end of said cylinder having an axial opening therein defining the path of travel of said nozzle, means for effecting a seal between the end of the plug and the end of the cylinder and serving to retain the nozzle in the axial opening of the plug member, said means including a ring having a groove to receive thermosetting material and a water jacket having inlet and outlet orifices surrounding said cylinder adjacent to said elongated nozzle; and a recirculating water system including a recirculating pump, a thermostatically controlled heater element, and heat dissipating means, said recirculating water system being connected by conduits to said water jacket of said nozzle assembly and serving to progressively raise the temperature of the material passing through said cylinder to a temperature of plastification but below the setting temperature of said thermosetting material.

14. An apparatus for molding thermosetting material comprising a mold adapted to receive injections of plasticized thermosetting material through an inlet orifice; means for maintaining the temperature of said mold above the setting temperature of said material; a nozzle assembly including a cylinder, a piston member reciprocable in said cylinder, and an elongated nozzle slidably mounted in said cylinder and having a discharge orifice of said mold, said elongated nozzle being positioned to slide in said cylinder in response to the reciprocating movement of said piston in a manner to make contact with the inlet orifice of said mold when said piston is on the pressure stroke and to break contact with said inlet orifice of said mold when said piston is on the return stroke, means for injecting thermosetting material into said cylinder, a spreader mounted adjacent to the discharge end of said cylinder, a plug in the discharge end of said cylinder having an axial opening therein defining the path of travel of said nozzle, means for effecting a seal between the end of the plug and the end of the cylinder and serving to retain the nozzle in the axial opening of the plug member, said means including a ring having grooves to receive thermosetting material, a water jacket having inlet and outlet orifices surrounding said cylinder adjacent to said elongated nozzle; and a recirculation water system including a recirculating pump, a thermostatically controlled heater element responsive to decreases in temperature of said recirculating water to maintain the temperature of said water at a preselected level, and heat dissipating means having a heat dissipating capacity sufficient to dissipate heat energy at a rate at least as great as the maximum rate of heat absorption by said nozzle assembly from all sources less the rate of heat energy absorption by said thermosetting material at the rate of flow of said material through said nozzle whereby the temperature of the material passing through said cylinder is progressively raised to a temperature of plastification but below the setting temperature of said thermosetting material.

(References on following page)

References Cited by the Examiner

UNITED STATES PATENTS

| | | | |
|---|---|---|---|
| 2,460,831 | 2/49 | Kovacs | 264—331 |
| 2,565,522 | 8/51 | Renier | 18—30 |
| 2,804,649 | 9/57 | Hupfield | 18—30 |
| 2,986,776 | 6/61 | Frohring | 18—30 |
| 3,052,925 | 9/62 | Bronnenkant et al. | 264—328 |
| 3,129,465 | 4/64 | Poyner | 18—30 |

ROBERT F. WHITE, *Primary Examiner.*

ALEXANDER H. BRODMERKEL, *Examiner.*